(12) United States Patent
Rückriem

(10) Patent No.: US 7,733,423 B2
(45) Date of Patent: Jun. 8, 2010

(54) METHOD FOR AVOIDING SWITCH-OVER DELAYS WHEN CHANGING CHANNELS IN DIGITAL TELEVISION TRANSMISSION SYSTEMS

(75) Inventor: Reinhard Rückriem, München (DE)

(73) Assignee: Infineon Technologies AG, Neubiberg (DE)

(*) Notice: Subject to any disclaimer, the term of this patent is extended or adjusted under 35 U.S.C. 154(b) by 1446 days.

(21) Appl. No.: 11/055,315

(22) Filed: Feb. 10, 2005

(65) Prior Publication Data
US 2005/0174483 A1 Aug. 11, 2005

(30) Foreign Application Priority Data
Feb. 11, 2004 (DE) .................. 10 2004 006 768

(51) Int. Cl.
*H04N 5/445* (2006.01)
(52) U.S. Cl. .................................. 348/563
(58) Field of Classification Search ......... 348/563–565, 348/731, 725, 732, 726, 552, 553; 725/139, 725/131, 46
See application file for complete search history.

(56) References Cited

U.S. PATENT DOCUMENTS

| | | | | |
|---|---|---|---|---|
| 4,625,230 A * | 11/1986 | Tan et al. ................... 348/489 |
| 4,704,629 A * | 11/1987 | Vreeswijk et al. ...... 375/240.25 |
| 4,825,436 A * | 4/1989 | Kobayashi et al. .......... 370/505 |
| 5,900,868 A * | 5/1999 | Duhault et al. ................ 725/42 |
| 6,118,498 A * | 9/2000 | Reitmeier .................... 348/725 |
| 6,804,824 B1 * | 10/2004 | Potrebic et al. ............... 725/38 |
| 7,373,650 B1 * | 5/2008 | Rodriguez et al. ............ 725/41 |
| 2004/0034863 A1* | 2/2004 | Barrett et al. ................. 725/38 |
| 2004/0181813 A1* | 9/2004 | Ota et al. .................... 725/131 |
| 2005/0210506 A1* | 9/2005 | Benliyan ..................... 725/46 |

FOREIGN PATENT DOCUMENTS

| JP | 09023388 A | 1/1997 |
|---|---|---|
| JP | 11088793 A | 3/1999 |

* cited by examiner

*Primary Examiner*—Paulos M Natnael
(74) *Attorney, Agent, or Firm*—Dickstein, Shapiro, LLP.

(57) ABSTRACT

A method for avoiding switch-over delays when changing channels in digital television transmission systems is based on a television transmission system in which a plurality of channels (K1, . . . , Kn) are transmitted in time-division-multiplexed fashion in a data stream (5). An overview channel comprising television picture information items from a plurality of the transmitted channels is provided at the transmitting end. The overview channel is decoded in the television receiver, and the picture information items of the selected channel that are provided in the overview channel are represented while changing channels.

14 Claims, 2 Drawing Sheets

METHOD FOR AVOIDING SWITCH-OVER DELAYS WHEN CHANGING CHANNELS IN DIGITAL TELEVISION TRANSMISSION SYSTEMS

PRIORITY

This application claims priority from German Patent Application No. 10 2004 006 768.6, which was filed on Feb. 11, 2004.

TECHNICAL FIELD OF THE INVENTION

The present invention relates to methods for avoiding switch-over delays when changing channels in digital television transmission systems in which a plurality of channels are transmitted in time-division-multiplexed fashion in a data stream. Furthermore, the invention relates to a method for making it possible at the transmitting end to avoid switch-over delays when changing channels in television transmission systems of this type.

In digital television transmission systems in which the channels are combined into a single data stream by time-sequential multiplexing, considerable delays may occur when changing channel. One reason for this is that on selection of a desired channel, this channel can be decoded only when the corresponding time slot assigned to this channel occurs at the television receiver. Since the duration of the multiplex cycles may be of the order of magnitude of one or more seconds, switch-over delays up to the duration of a plurality of seconds (i.e. a maximum of one multiplex cycle) may occur. Delays longer than 100 ms are perceived by the viewer, delays longer than 1 second already being found to be very disturbing.

SUMMARY OF THE INVENTION

The invention is based on the object of specifying methods which enable switch-over delays essentially to be avoided or in any event to be significantly reduced.

Furthermore, the invention is aimed at specifying a method—to be performed in the television transmitter—for making it possible to avoid switchover delays when changing channels in digital television transmission systems.

In accordance with a first aspect of the invention, an overview channel comprising television picture information items from a plurality of the transmitted channels is provided at the transmitting end in the digital television transmission system. The overview channel is decoded in the television receiver. When changing channels in the television receiver, the television picture information of the selected channel that is provided in the overview channel is displayed.

The invention is thus based on the idea of supplying the television receiver with a compilation of reference television picture information items from the transmitted channels via an additional channel—the overview channel—the switch-over delay that occurs when changing channels being bridged by the display of the television picture information of the selected channel that is provided in the overview channel. Therefore, when changing channels, the television viewer immediately receives a more or less up-to-date television picture of the selected channel, which is generally sufficient for a first orientation of the viewer. In particular, a fast program change (so-called "zapping") is supported by the invention.

It is sufficient in many cases to show a (single) still picture of the selected channel as television picture information of said channel. As an alternative, however, the television picture information of the selected channel that is shown in the television receiver may also be a still picture sequence of e.g. 25 or 30, snapshots, from the selected channel. In this case, a higher power consumption is required in the television receiver for the decoding and display of the picture information and it is necessary for the overview channel to transmit still picture sequences (i.e. not just a single still picture) of the selectable or transmitted channels. The representation of the still picture sequence conveys to the viewer, in particular in the case of moving pictures, a picture information item that already comes very close to the actual television reception.

From the standpoint of saving energy in the television receiver, it may be advantageous if only a portion of the time slots used for the overview channel in the data stream is used for the decoding of the overview channel in the television receiver. By way of example, it may be provided that only the data of every m-th time slot of the overview channel are decoded in the television receiver, m being an integer where $m \geq 2$. This measure makes it possible to find a compromise between the up-to-date nature of the television picture information items represented in the switch-over phase and the power demands of the television receiver. In particular, it may be provided that the number m is dependent on the present capacity of the power supply (e.g. charge state of the battery) in the television receiver.

It may furthermore be provided that television picture information items from the overview channel are decoded and kept ready in the television receiver only for a portion of the transmitted channels. In other words, only television picture information items of those channels from the overview channel for which a higher probability for a channel change is present, e.g. on account of the individual channel selection behaviour or for other reasons, are decoded selectively. Such preferred channels may be for example those two or in each case more channels whose program locations that can be selected in the control panel lie directly below or directly above the currently selected channel (this furthermore supports sequentially "zapping through", the program locations) or they may be such channels which have been determined as preferred channels of the viewer on the basis of a "hit list" (this furthermore supports "targeted zapping" to preferred television programs).

All of the above measures (representation of still pictures or still picture sequences, decoding only of specific time slots of the overview channel, decoding of television picture information items with regard to only a portion of the transmitted channels from the overview channel) may be selected in a manner dependent on the present capacity of the power supply in the television receiver.

In accordance with an aspect of the invention, avoiding switch-over delays according to the method specified above is made possible by virtue of the fact that an overview channel comprising television picture information items from a plurality of the transmitted channels is provided at the transmitting end.

In accordance with a second aspect of the present invention, a method for avoiding switch-over delays when changing channels in digital television transmission systems is characterized in that the selected channel is decoded and, moreover, television picture information items from at least one other channel that is monitored in the background are decoded. The television picture information items of the monitored channel are stored temporarily. If a change is made to the monitored channel, the stored television picture information items of the monitored channel are shown in the switch-over phase (i.e. in the time period between the channel selection and the regular decoding of the selected channel).

The basic concept of this second aspect of the invention thus consists in performing a foresighted monitoring of at least one—but generally a plurality of the transmitted channels—and temporarily storing television picture information items of the monitored channels. The stored television picture information items have to be renewed from time to time in order to ensure that they are sufficiently up-to-date. When changing channels, the temporarily stored television picture information of the selected channel is accessed and is represented to the viewer in the switch-over phase.

In comparison with the method according to the first aspect of the invention, the method according to the second aspect of the invention has the advantage that an additional overview channel does not have to be provided on the part of the television transmitter, that is to say that the method is resource-sparing with regard to the available frequency bandwidth and can be implemented independently of the provider responsible for the television transmission. However, the particular feature of the method according to the first aspect, namely of being able to acquire all the television picture information items of the remaining channels within a single time slot, is obviated. This particular feature enables the television receiver to exhibit a particularly current-saving of operation.

Preferably, in the case of the method according to the second aspect of the invention, television picture information items from a plurality of other channels, in particular all transmitted channels, are decoded and temporarily stored. This makes it possible to ensure that a television picture information item is always available for bridging the switch-over phase during a channel selection.

The monitoring of the other channels can be effected very flexibly in a manner similar to that in the case of the method according to the first aspect of the invention. In particular, it may be provided that television picture information items with regard to only a portion of the channels contained in the data stream (excluding the current channel)—e.g. of the adjacent channels or the channels of a hit list for the channel selection—are decoded and temporarily stored and/or that television picture information items of the monitored channels are in each case decoded only every m time division multiplex cycles, where m≧2. Furthermore, specific channels (e.g. adjacent channels or channels of a hit list for the channel selection) may be monitored more frequently or more television picture items may be extracted from specific channels (see above) during monitoring.

The channel monitoring of the remaining channels may be carried out in particular in the following different operating modes: it may be provided that the television picture information items of the monitored channels are all decoded in one and the same time division multiplex cycle. As already mentioned, the monitoring may in this case be repeated only every m time division multiplex cycles. As an alternative, it is possible for the television picture information items of the monitored channels to be decoded in time-offset fashion with regard to the time division multiplex cycle, i.e. for different channels to be monitored and decoded in successive time slots. In this case, too, it is possible for a specific channel to be decoded only every m time division multiplex cycles.

The monitoring frequency (i.e. the number 1/m) may be different for the monitored channels and be selected in a manner dependent on the energy resources of the television receiver or on the expected channel selection behaviour of the viewer (adjacent channels, hit list of channels). Furthermore, in this method, too, the quantity of television picture information items determined (e.g. still picture or still picture sequence) can be predetermined in a manner dependent on the abovementioned criteria or be set as desired.

BRIEF DESCRIPTION OF THE DRAWINGS

The invention is explained in more detail below in an exemplary manner with reference to the drawings, in which.

DETAILED DESCRIPTION OF THE PREFERRED EMBODIMENTS

Figure 1:
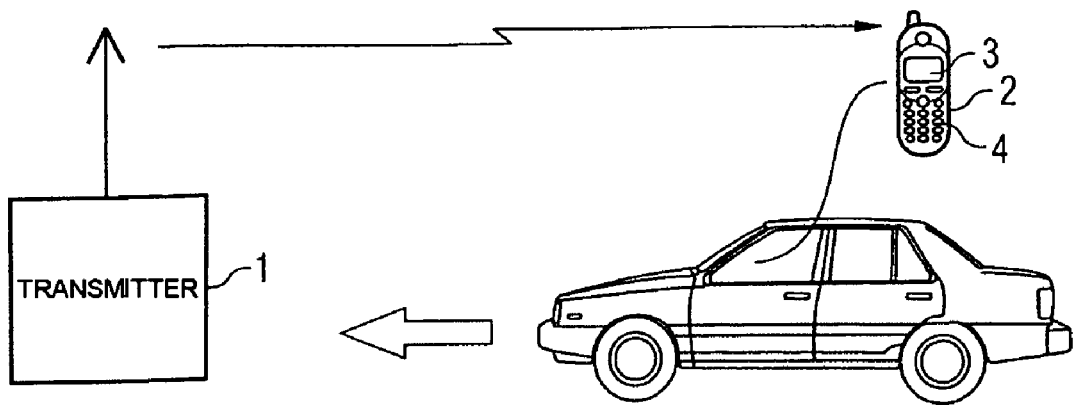
FIG. 1 shows a schematic illustration of a television transmission system with a transmitter and a mobile receiver.

FIG. 1 shows a situation such as typically occurs in digital television transmission. A stationary transmitter 1 transmits audio and video data in digital form to a mobile, moving terminal 2, e.g. a PDA (personal digital assistant) or a mobile telephone. The latter has a display or screen 3, by means of which the television picture can be represented. The program selection can be performed by means of a keypad 4. The mobile terminal 2 has its own power supply, typically in the form of chargeable accumulators.

The video and audio data are transmitted in accordance with a predetermined standard. The DVB-H (Digital Video Broadcasting-Handheld) Standard is considered in an exemplary manner below.

Figure 2:
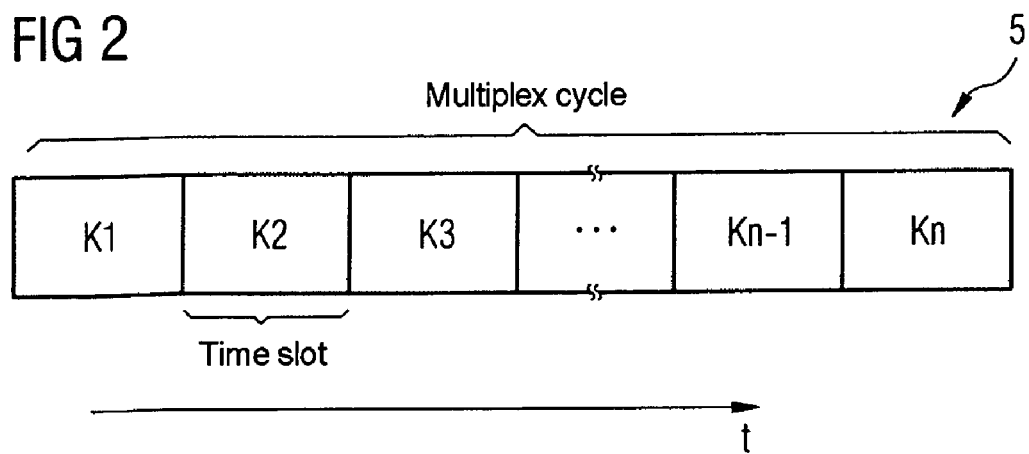
FIG. 2 shows the data structure of a multiplexed digital data stream for television or video transmission.

In the case of the DVB-H Standard, each individual television channel is coded at 384 kBit/s. A number of n channels (e.g. n=10) is combined to form a single data stream 5 by time division multiplexing, see FIG. 2. The data stream 5 thus has a data rate or bandwidth of n*384 kBit/s, i.e. for n=10 of 3.84 MBit/s. The television channels K1, K2, . . . , Kn are multiplexed using time-sequential time slots having a duration of e.g. 300 ms per channel. Time is designated by t in FIG. 2.

Since each television channel K1, K2, . . . , Kn is operated only every n*300 ms, a time duration of the multiplex cycle of 3 seconds results given n=10. That is to say that a time duration of 3 seconds elapses between the arrival of successive time slots for a specific channel. Consequently, in normal operation, the receiver 2 also only has to be activated every 3 seconds for 300 ms in each case. This enables a low-power mode for the mobile receiver.

When changing channels, it is therefore possible, however, for time delays of up to 3 seconds to occur. According to the invention, these time delays can be bridged as follows:

A first possibility consists in transmitting, in a specific one of the television channels K1, K2, . . . , Kn, which is referred to as an overview channel, periodically current still pictures or still picture sequences of all receivable channels (under certain circumstances including such channels which are broadcast at different transmission frequencies). In contrast to the matrix representation of television pictures that is customary in some instances in cable television systems, up to 25 or 30 still pictures ("snapshots") per second, each at maximum resolution (e.g. 360×288 pixels), can be transmitted in digital television transmission systems such as DVB-H, for example.

Figure 3:
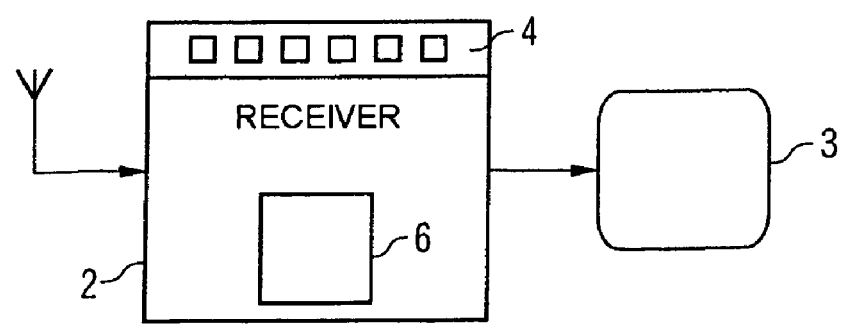
FIG. 3 shows a greatly simplified, schematic illustration of a mobile receiver.

For the example chosen here where n=10, the receiver 2 thus receives via the overview channel, every 3 seconds, television picture information items in the form of still pictures or short still picture sequences ("video loops") of all programs broadcast simultaneously. These regularly received television information items of the remaining channels (i.e. preferably of all the channels apart from the channel currently being received) are stored in a buffer memory 6 (see FIG. 3), which is regularly updated during a decoding of the overview channel. For this purpose, the mobile television receiver 2 has to be active for a maximum of two timeslot durations per multiplex cycle namely for the decoding of the currently selected channel and the overview channel. Since the overview channel need not necessarily be decoded in every multiplex cycle, but rather e.g. only in every m-th multiplex cycle, the power consumption of the mobile terminal can be reduced when required, although losses have to be accepted with regard to the up-to-date nature of the stored television picture information items and thus with regard to the real-time behaviour of the system.

When a new channel is selected, the receiver 2 accesses the television picture information assigned to this channel in the memory 6 and represents it immediately on the screen 3. It is only when the time slot of the selected channel is present and the current television and audio information items of this channel are available that a switch back to regular operation is made and a television picture based on the information items transmitted in the selected channel is shown.

A second possibility for determining the television picture information items required for bridging the switch-over phase consists in carrying out the continuous foresighted monitoring of a portion or all of the received channels K1, K2, ..., Kn (with the exception of the currently selected channel). In this case, for each channel K1, K2, ..., Kn, a specific portion of the data received in the associated time slot is decoded and written to the buffer memory 6. The quantity of data extracted during the monitoring of a channel K1, K2, ..., Kn may correspond for example to an individual still picture or to a short still picture sequence. During a channel change, the television picture information assigned to the selected channel is read from the buffer memory 6 and represented on the screen 3.

The monitoring of the remaining channels may be effected in various ways: it may be provided that specific or all of these channels are not monitored in each multiplex cycle but rather only every m multiplex cycles where m≧2. Both the extracted quantity of television picture information items and the number m may be predetermined individually, i.e. be different, for each channel.

The monitoring of the remaining channels may either be performed for all channels in single multiplex cycle, or it is possible to monitor a first group of channels in a first multiplex cycle, to monitor a second group of channels in a second multiplex cycle, etc. In this case, a group of channels may also comprise just one single channel, and the two multiplex cycles may, but need not, be directly successive multiplex cycles.

Both in the case of the first possibility (provision of an overview channel) and in the case of the second possibility (foresighted monitoring of the non-selected channels K1, K2, ..., Kn), a monitoring list or hit list may be managed, the channels to be monitored being entered therein. By way of example, after a program change from a channel Km to a channel Km', the old channel Km may be automatically adopted into the monitoring list.

Figure 4A:
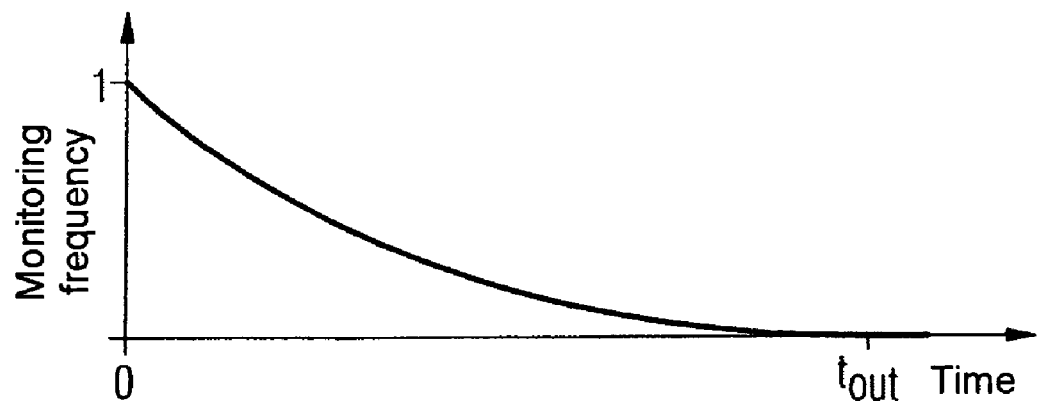
FIGS. 4a and b show two examples of time functions which specify the monitoring frequency of a channel after a channel change to another channel.
Figure 4B:
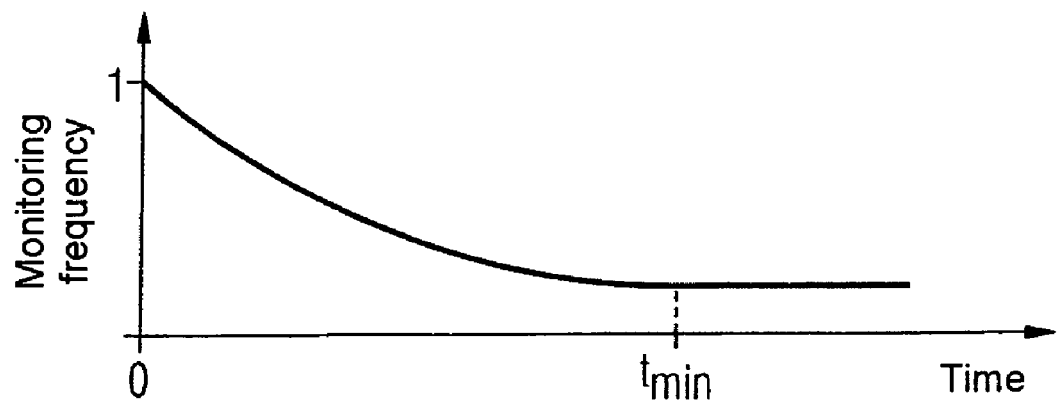

The monitoring frequency of each channel (corresponds to the variable 1/m) may be altered in accordance with a freely selectable time function. In accordance with FIG. 4$a$, it may be provided that the monitoring frequency falls to zero in accordance with a curve, so that the channel is removed from the monitoring list after a certain time $t_{out}$, i.e. this channel is no longer monitored. In accordance with FIG. 4$b$, however, it may also be provided that the monitoring frequency of a channel falls with time, but asymptotically approaches a predetermined minimum monitoring frequency. After a specific time duration $t_{min}$, the corresponding channel is then monitored only with this minimum monitoring frequency. After a new selection of the channel is considered and a later channel change (instant t=0), in accordance with FIGS. 4$a$ and 4$b$, the old channel is initially monitored again with the high monitoring frequency (e.g. 1/m=1).

It is pointed out that it is not absolutely necessary for all monitored channels K1, K2, ..., Kn to be transmitted at the same frequency. In the manner already described, other frequencies (with further programs) may also be monitored within the periods of time between the decoding of the currently selected channel.

The disadvantage of the second possibility (foresighted monitoring of the non-selected channels K1, K2, ..., Kn) in comparison with the first possibility (provision of an overview channel) is that a higher current consumption is to be expected on account of the more frequent updatings of the buffer memory 6.

The two possibilities are comparable in many different respects (e.g. the reduction of the current consumption by reducing the number of monitored channels, the selection of the quantity of information used during monitoring, and also the updating frequency of the television picture information items determined during monitoring), so that measures that have been described in connection with one possibility can also be used in the case of the other possibility. What is common to both possibilities is that, when changing channels to a monitored channel, it is always possible to ensure that a picture information item from the selected channel appears on the screen 3 without any significant time delay.

I claim:

1. A method for avoiding switch-over delays when changing channels in digital television transmission systems, in which a plurality of channels are transmitted in time-division-multiplexed fashion in a data stream, an overview channel comprising television picture information items from a plurality of the transmitted channels being provided at the transmitting end, the method comprising:
   decoding of the overview channel in the television receiver;
   when changing channels in the television receiver, displaying the television picture information of the selected channel that is provided in the overview channel,
   wherein only a portion of the time slots used for the overview channel in the data stream is used for the decoding of the overview channel in the television receiver.

2. The method according to claim 1, wherein the television picture information of the selected channel that is shown in the television receiver is a still picture.

3. The method according to claim 1, wherein the television picture information of the selected channel that is shown in the television receiver is a still picture sequence.

4. The method according to claim 1, wherein the frequency of the decoding of television picture information items from the overview channel, for a given channel, is performed according to a predetermined time function.

5. The method according to claim 1, wherein television picture information items from the overview channel are decoded in the television receiver only for a portion of the transmitted channels.

6. The method according to claim 1, wherein the digital television transmission system is a television transmission system for battery-operated and/or mobile terminals, in particular mobile telephones and personal digital assistants.

7. The method according to claim 6, wherein the digital television transmission system is Digital Video Broadcasting-Handheld (DVB-H).

8. A method for avoiding switch-over delays when changing channels in digital television transmission systems, in which a plurality of channels are transmitted in time-division-multiplexed fashion in a data stream, an overview channel comprising television picture information items from a plurality of the transmitted channels being provided at the transmitting end, the method comprising:
- decoding of the overview channel in the television receiver;
- when changing channels in the television receiver, displaying the television picture information of the selected channel that is provided in the overview channel,
- wherein a monitoring list is managed in the television receiver, the channels to be decoded from the overview channel being entered in said monitoring list, and in that, after a program change from a first channel to a second channel, the first channel is automatically adopted into the monitoring list.

9. A method for avoiding switch-over delays when changing channels in digital television transmission systems in which a plurality of channels are transmitted in time-division-multiplexed fashion in a data stream, comprising the following steps carried out in the television receiver:
- decoding the currently selected channel, and decoding and temporarily storing television picture information items from all channels in the data stream apart from the currently selected channel, wherein the frequency of the decoding of television picture information items from a monitored channel is performed according to a predetermined time function;
- temporarily storing the television picture information items of the monitored channel; and
- when changing channels to the monitored channel, displaying the stored television picture information items of the monitored channel,
- wherein a monitoring list is managed in the television receiver, those channels from which television picture information items are intended to be decoded and temporarily stored being entered into said monitoring list, and in that, after a program change from a first channel to a second channel, the first channel is automatically adopted into the monitoring list.

10. The method according to claim 9, wherein television picture information items with regard to only a portion of the channels contained in the data stream excluding the currently selected channel are decoded and temporarily stored.

11. The method according to claim 9, wherein the temporarily stored television picture information items of the selected channel are a still picture.

12. The method according to claim 9, wherein the temporarily stored television picture information items of the selected channel are a still picture sequence.

13. A method for avoiding switch-over delays when changing channels in digital television transmission systems in which a plurality of channels are transmitted in time-division-multiplexed fashion in a data stream, comprising the following steps carried out in the television receiver:
- decoding the currently selected channel and decoding television picture information items from at least one other, monitored channel, wherein the television picture information items of a monitored channel are in each case decoded every m time division multiplex cycles, m being an integer where m>2;
- temporarily storing the television picture information items of the monitored channel; and
- when changing channels to the monitored channel, displaying the stored television picture information items of the monitored channel,
- wherein the frequency of the decoding of television picture information items from a monitored channel is performed according to a predetermined time function.

14. A method for avoiding switch-over delays when changing channels in digital television transmission systems in which a plurality of channels are transmitted in time-division-multiplexed fashion in a data stream, comprising the following steps carried out in the television receiver:
- decoding the currently selected channel and decoding television picture information items from at least one other, monitored channel, wherein the television picture information items of all the monitored channels are in each case decoded in the same time division multiplex cycle;
- temporarily storing the television picture information items of the monitored channel; and
- when changing channels to the monitored channel, displaying the stored television picture information items of the monitored channel,
- wherein the frequency of the decoding of television picture information items from a monitored channel is performed according to a predetermined time function.

* * * * *